UNITED STATES PATENT OFFICE.

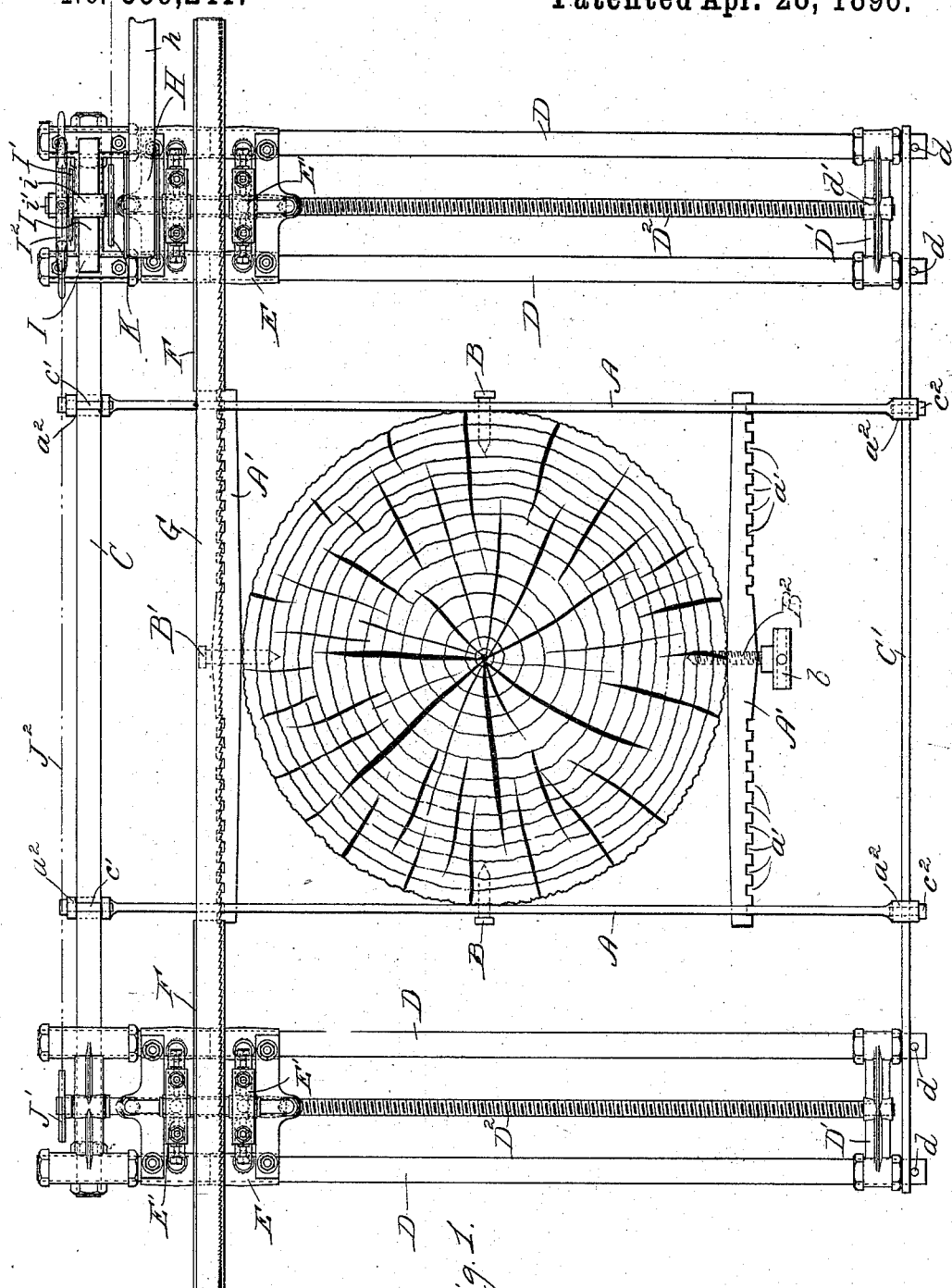

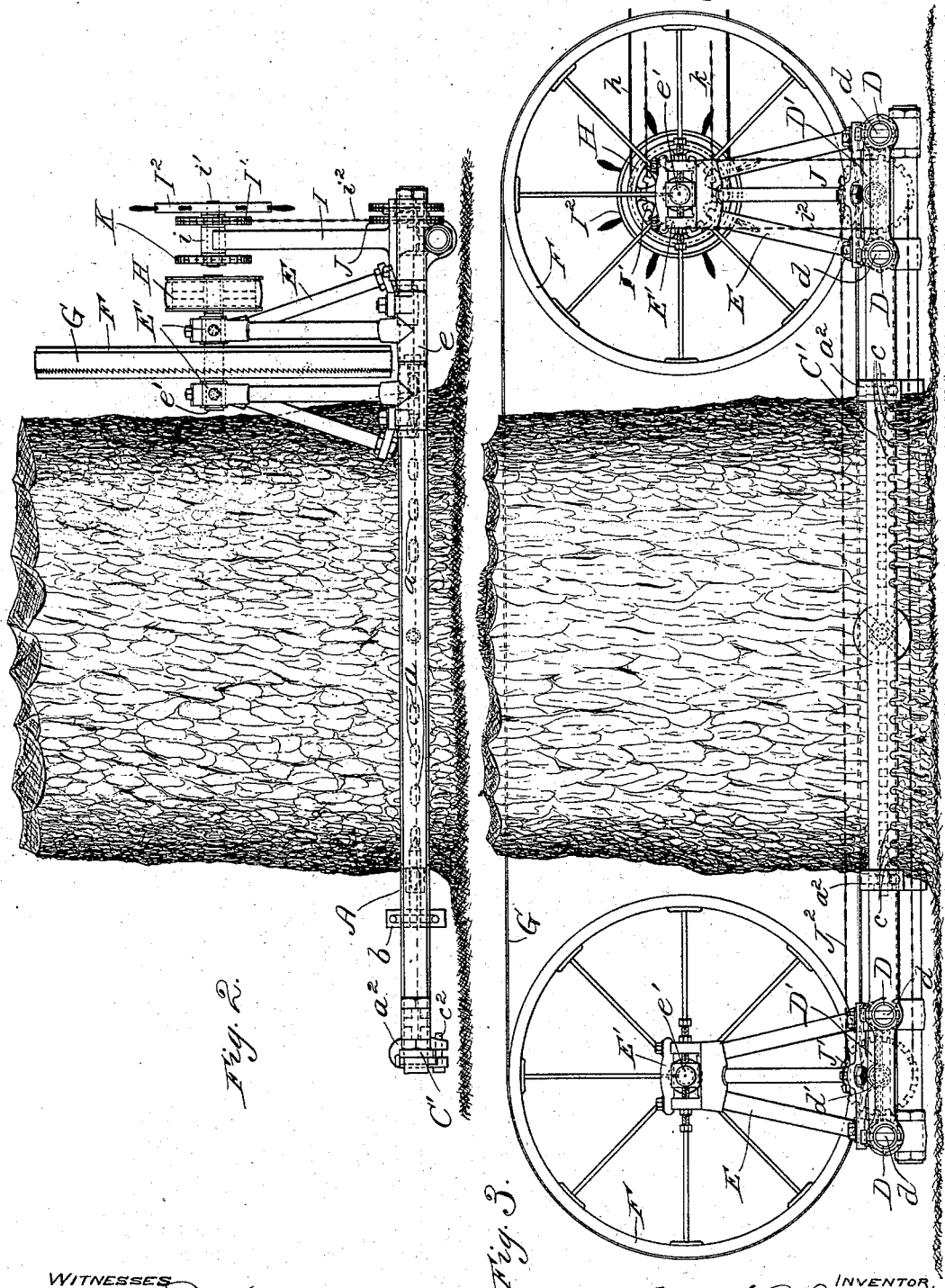

JOHN B. WENDL, OF MILWAUKEE, WISCONSIN.

STUMP-CUTTING MACHINE.

SPECIFICATION forming part of Letters Patent No. 559,241, dated April 28, 1896.

Application filed August 26, 1895. Serial No. 560,624. (No model.)

*To all whom it may concern:*

Be it known that I, JOHN B. WENDL, a citizen of the United States, residing at Milwaukee, county of Milwaukee, State of Wisconsin, have invented a certain new and useful Improvement in Stump-Cutting Machines; and I declare the following to be a full, clear, and exact description of the invention, such as will enable others skilled in the art to which it pertains to make and use the same, reference being had to the accompanying drawings, which form a part of this specification.

My invention relates to machines for cutting tree-stumps, and relates more particularly to an improved device adapted to be secured upon the outside of and adapted to sever the stump above the root, and also to remove the uneven top, so as to obtain from the stump the portion of the same which is sound and in good condition for use.

My said invention consists in the matters hereinafter described, and pointed out in the appended claims.

In the accompanying drawings, illustrating my invention, Figure 1 is a plan view of my improved machine, illustrating the same as secured to the outside of the stump and in position for operation. Fig. 2 is an end elevation of the same. Fig. 3 is a rear elevation of the same.

Referring by letter to the drawings, A A and A' A' designate frame-pieces or bars constituting a rectangular frame and for attachment to the outside of the stumps. These frame-pieces are adjustably secured together in any desired manner, conveniently in the manner shown in the drawings, in which frame-pieces or bars A A are provided with slots or apertures $a$ $a$ for the reception of the ends of the bars A' A', as shown more particularly in Fig. 1. The bars A' A' are provided with notches $a'$ $a'$, adapted for engagement with the margins of the apertures $a$ $a$ in the frame-pieces A A. By this construction the rectangular frame is rendered adjustable and may be readily adjusted so as to fit closely to the outside of stumps of different diameters, it being only necessary in effecting such adjustment to adjust the frame-pieces A A so as to rest against opposite sides of the stump and then to insert the notched ends of the frame-pieces A' A' into the proper apertures $a$ $a$ to enable said frame-pieces A' A' to engage with the sides of the stump. The frame-pieces A A and A' A' will thus be held in their adjusted positions by the engagement of the notched ends of the frame-pieces A' A' within the apertures in the other frame-pieces.

Suitable spikes or bolts B B are passed through apertures in the frame-pieces A A and adapted to be driven into the sides of the stump, a similar spike or bolt B' being passed through the central part of one of the frame-pieces or bars A', and a suitable screw $B^2$ is passed through the central part of the opposite bar A' and is provided with a head $b$ for engagement with a suitable tool. In securing the rectangular frame to a stump the frame is first adjusted, as before described. The spikes or bolts B B are then driven into the stump, the spike or bolt B' then similarly driven into the stump, and the screw or bolt $B^2$ is then operated and forced into the opposite side of the stump, thereby firmly securing the frame in position.

The extremities of the frame-pieces A A are notched, as at $a^2$ $a^2$, for the reception of horizontal bars C and C', which latter bar is notched along one edge, as at $c$ $c$, in the manner shown more particularly in Fig. 3. Bolts or pins $c'$ $c'$ and $c^2$ $c^2$ serve, respectively, to hold the bars C and C' in engagement with the bars A A in the manner shown. In adjusting the frame upon the stump the frame-pieces A A are moved upon the bars C and C' into position to engage with the sides of the stump, and the bolts or pins $c^2$ $c^2$ are then inserted in the ends of said frame-pieces A A and engaged with appropriate ones of the notches $c$ $c$ in the bar C' so as to secure said bars in their adjusted position upon the rectangular frame.

Upon opposite ends of the bars C and C' are supported suitable carrying-frames or guides, each of which conveniently consists of two horizontal and parallel bars D D, which are secured to the ends of the bars C and C' in any convenient manner, as by means of pins or bolts $d$ $d$.

Suitable yoke-pieces D' D' connect the ends of each pair of the bars D D in the manner shown more particularly in Fig. 1, and a horizontal screw-threaded shaft $D^2$ is revolubly journaled in bearings $d'$ $d'$ in said yoke-pieces.

A suitable standard E, which may be constructed in any convenient manner, is mounted upon each pair of the bars D D, and has an operative engagement at its lower part with the horizontal screw-threaded shaft $D^2$, as at $e$.

Bearings $E'$ $E'$ are provided upon the upper ends of the standards E E, and in said bearings are journaled suitable shafts $e'$ $e'$, carrying suitable pulleys F F, over which is stretched a band-saw G. Upon one of the shafts $e'$ is provided an actuating-pulley H, over which a belt $h$ is trained, said belt leading to the driving mechanism upon the actuating-machine.

Upon the front end of one pair of bars D D is provided a suitable standard I, having a bearing $i$ in its upper end, in which is journaled a shaft $i'$. Upon the shaft $i'$ is provided a sprocket-wheel $I'$ and a hand-wheel $I^2$, the former being connected by a sprocket-chain $i^2$ with a sprocket-wheel J, secured to the screw-shaft $D^2$. A similar sprocket-wheel $J'$ is provided upon the other screw-shaft $D^2$ and operatively connected with the wheel J by means of a sprocket-chain $J^2$.

As shown in the drawings, a sprocket-wheel K is conveniently provided upon the shaft $i'$, and leads to the actuating mechanism.

It follows from the foregoing construction that motion being imparted to the pulley H by means of the belt $h$ the shaft $e'$ will be rotated, together with the pulley F thereon, thus actuating the saw G and the other pulley F, over which said saw is trained.

In beginning the operation of cutting a stump the carriages or standards in which the saw-carrying pulleys are mounted occupy a position such as shown in the drawings in Figs. 1 and 2, and by operating the hand-wheel $J^2$ the workman may readily advance or retract said standards or carriages at will, rotary motion being communicated by means of the chain gearing to the screws $D^2 D^2$, and thus adjusting the standards E E upon the longitudinal bars D D in an obvious manner. These bars D D thus constitute guides upon which the saw-carrying standards may be adjusted.

As shown more particularly in Figs. 2 and 3, the diameter of the saw-pulleys is made such that the distance between the two horizontal bars of the band-saw will be less than the ordinary or average height of the stumps, so that as the saw is advanced in the manner described it will operate to simultaneously sever the stump just above the root and to remove the uneven upper end of the stump.

By means of the hand-wheel the operator may advance the saw more or less rapidly as desired, so as to cut through the stump as rapidly as the character of the work will warrant.

My improved machine may, by making the framework of tubing, be made sufficiently light to enable it to be readily transported from place to place and readily readjusted upon the stumps to be cut.

By means of my improved machine the stumps remaining upon timber land, after the trees have been felled, may be readily, rapidly, and economically cut, so as to enable the sound parts of said stumps to be utilized for the manufacture of shingles, staves, and other small articles, and by the described construction the operator is enabled to simultaneously cut the stump from the root and the uneven top from the good part of the stump.

By making the supporting-frame adjustable, as described, the machine may be readily secured to stumps greatly differing in size.

Various modifications or alterations may be made in the details of construction without departing from my original invention, and I would have it understood that my said invention contemplates the use of a frame of any desired construction adapted to be secured to the outside of a stump and any kind of driving mechanism and any desired form of saw or saws for operatively engaging with the stump.

Having thus described my invention, what I claim as new, and desire to secure by Letters Patent of the United States, is—

1. A stump-cutting machine comprising the adjustable rectangular frame, the horizontal guides, the standards adjustable thereon, the saw-carrying pulleys, the band-saw carried thereby, and suitable mechanism actuated by the driving mechanism for automatically and simultaneously adjusting both of said standards so as to advance or retract the saw, substantially as described.

2. A stump-cutting machine comprising the adjustable rectangular frame, the horizontal guides, the standards adjustable thereon, the saw-carrying pulleys, the band-saw carried thereby, the screw-shafts engaging respectively with said standards and means for imparting coincident rotation to both of said screw-shafts, substantially as described.

3. A stump-cutting machine comprising the adjustable rectangular frame, the horizontal guides, the standards adjustable thereon, the saw-carrying pulleys, the band-saw carried thereby, the screw-shafts engaging respectively with said standards, and carrying sprocket-wheels operatively connected together, and a hand-wheel mounted upon the frame and having an operative connection with one of said screw-shafts, substantially as described.

4. A stump-cutting machine comprising the adjustable rectangular frame, the horizontal guides thereon, the standards adjustable on said guides, the screw-shafts engaged respectively with said standards, and carrying-pulleys mounted upon said standards, a band-saw carried thereby, sprocket-wheels upon said screw-shafts connected by a sprocket-chain, a fixed standard upon the frame, a hand-wheel journaled thereon, and a sprocket-wheel actuated by said hand-wheel, and having an operative connection with a sprocket-wheel upon one of said screw-shafts, substantially as described.

In testimony whereof I sign this specification in the presence of two witnesses.

JOHN B. WENDL.

Witnesses:
 JOHN E. WILES,
 M. M. WILES.